United States Patent [19] [11] 4,052,655
Vizza [45] Oct. 4, 1977

[54] BATTERY RECHARGING METER
[76] Inventor: Joseph Vizza, 414 Broad Ave., Belle Vernon, Pa. 15012
[21] Appl. No.: 611,989
[22] Filed: Sept. 10, 1975
[51] Int. Cl.² ............................................. B65G 11/00
[52] U.S. Cl. ........................................ 320/2; 194/11; 194/49
[58] Field of Search ........................................ 320/2–5, 320/37, 38; 194/1 M, 4 C, 11, 17, 40, 49, 64; 180/65 R; 222/14

[56] References Cited
U.S. PATENT DOCUMENTS

| 735,505 | 8/1903 | Haskins | 320/2 |
| 1,924,533 | 8/1933 | Babson | 194/49 |
| 2,069,445 | 2/1937 | Hopkins | 194/49 |
| 3,270,267 | 8/1966 | Nolte, Jr. | 320/56 |
| 3,904,947 | 9/1975 | Crews | 180/65 X |
| 3,938,018 | 2/1976 | Dahl | 320/2 |

Primary Examiner—Robert J. Hickey
Attorney, Agent, or Firm—Victor J. Evans & Co.

[57] ABSTRACT

A meter stand for use in recharging the batteries of battery powered vehicles including a register to indicate the cost of the recharging service and a coin operated locking means preventing disconnection of the vehicle from the meter until the cost of the recharging service has been paid.

3 Claims, 6 Drawing Figures

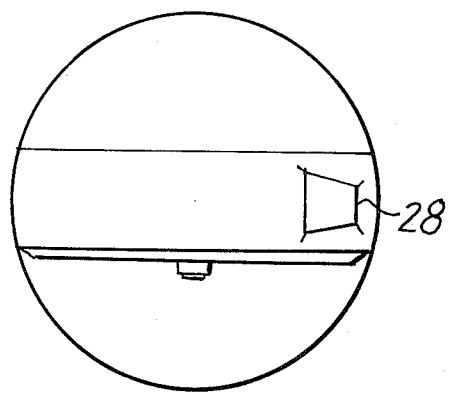
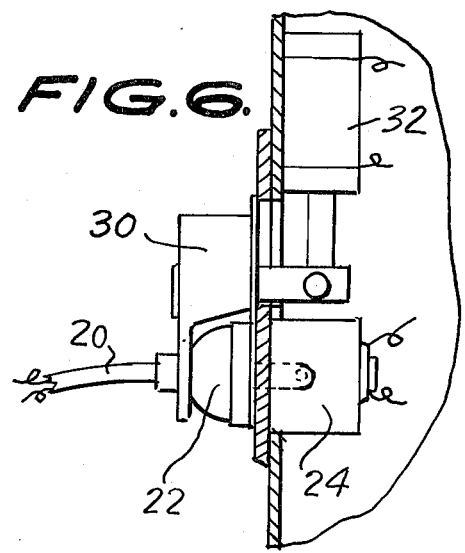
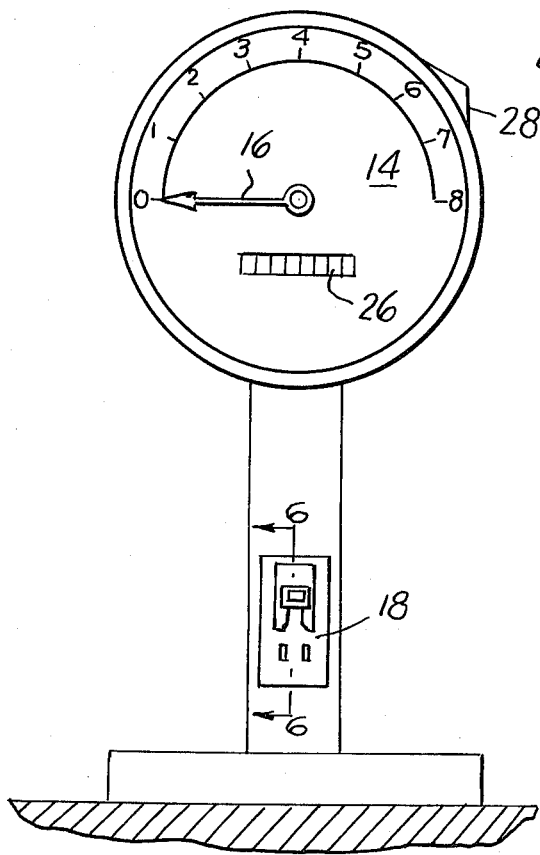
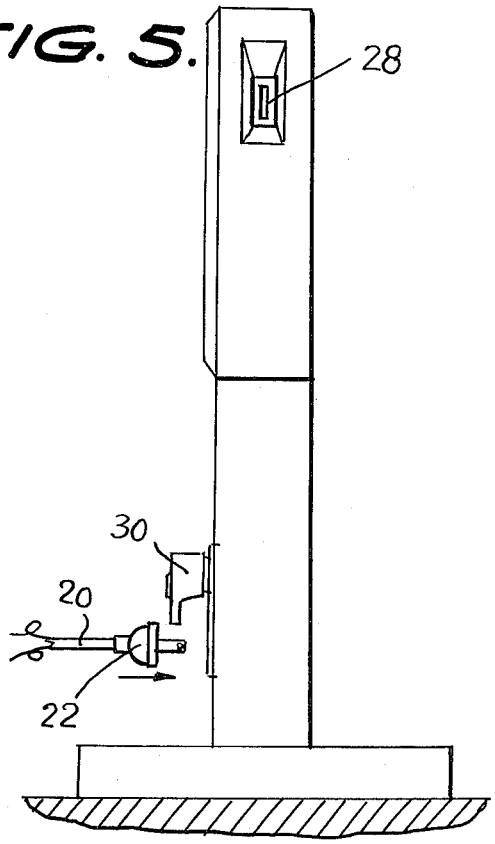

BATTERY RECHARGING METER

BACKGROUND OF THE INVENTION

1. Field of the Invention

There is increasing interest in battery powered vehicles especially for short haul or local use. Batteries, however, need to be recharged periodically. It is not necessary for a battery to be run down before recharging to any greater degree than it is necessary for the gasoline supply in a gasoline powered vehicle to be depleted before refilling. It is desirable, therefore, to provide for battery recharging stations similar to gasoline filling stations.

2. Summary of the Invention

It is an objective of the present invention to provide a battery filling or charging station for automotive vehicles at which a connection may be made to the vehicle battery and the amount to be paid will be determined by the time and the rate at which the charging current is applied.

Other objects and advantages will become apparent in the following specification when considered in light of the attached drawings.

BRIEF DESCRIPTION OF THE DRAWINGS

FIG. 3 is a plan view of a battery charging meter stand of the present invention;

FIG. 4 is a front elevation of the battery charging meter stand;

FIG. 5 is a side view of the battery charging meter stand; and

FIG. 6 is a fragmentary partly sectional view taken on line 6—6 of FIG. 4 showing the locking means to assure against disconnection of the charging cable before completion of the charging time for which coins have been inserted.

DESCRIPTION OF THE PREFERRED EMBODIMENT

Figure 1:
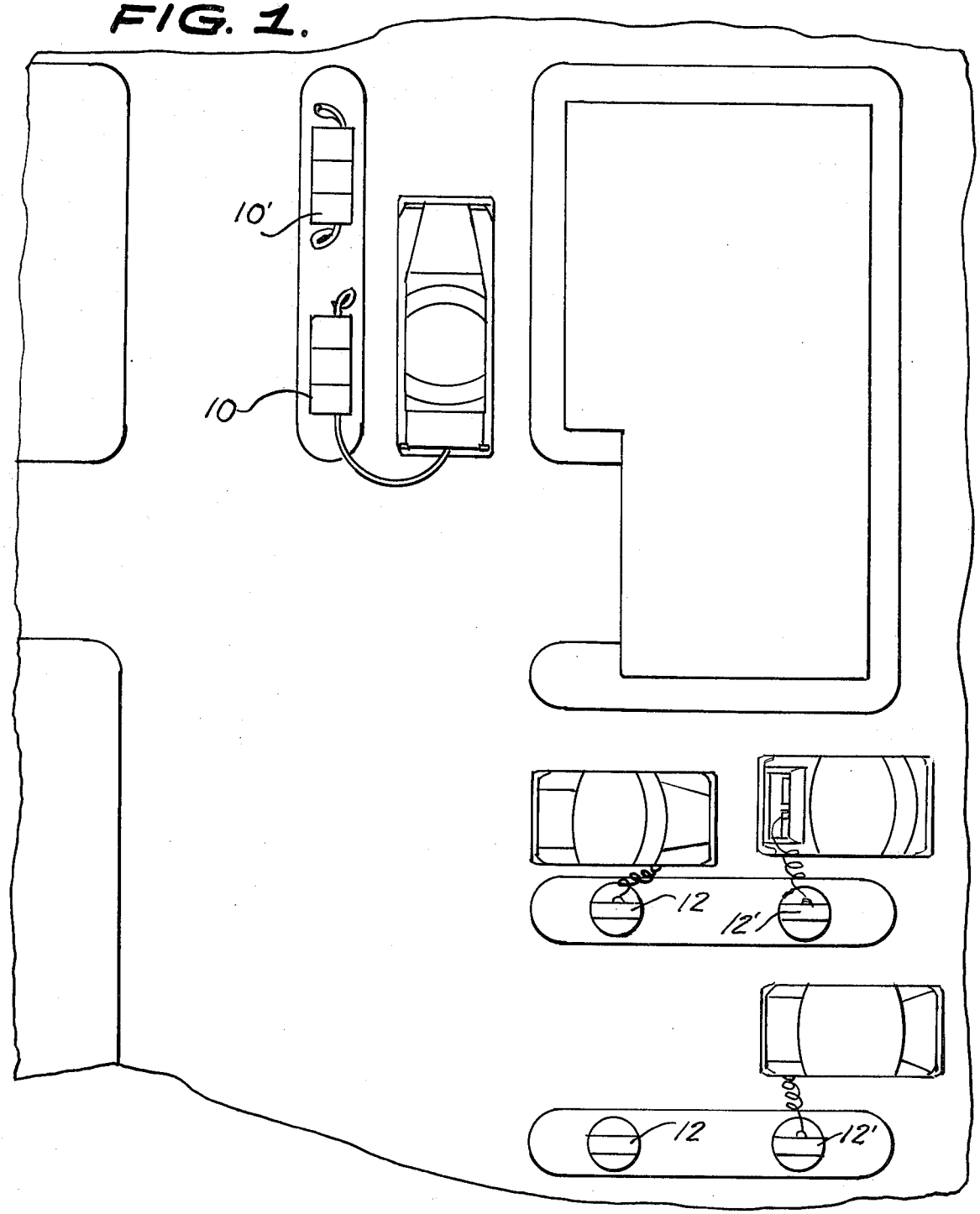
FIG. 1 is a plan view of a filling station showing both gasoline pumps and battery recharging stands.

It is well known that batteries cannot be recharged in the very few moments that a gasoline tank can be refilled. As seen in FIG. 1, therefore, a service station may have service lanes for gasoline powered automobiles and other lanes for electric automobiles. In FIG. 1 gasoline pumps are seen at 10, 10' and electric battery charging meters are seen at 12, 12' at each service island.

Figure 2:
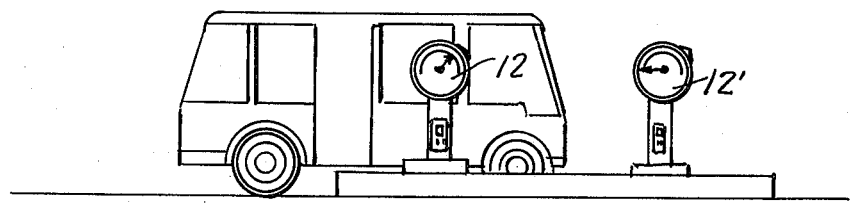
FIG. 2 is an elevation showing a battery powered vehicle at a battery charging stand.

FIG. 2 shows in elevation an electric van at a battery charging meter.

Referring to FIGS. 3, 4 and 5 we see a battery charging meter stand. From FIG. 4 it is seen that there is a dial 14 carrying a pointer 16 pivoted at the center of the dial. This pointer is mounted on a clockworks device (not shown) within the dial, similar to a parking meter. The numerals along the periphery of the dial indicate the time for which it is desired that the vehicle be operatively connected to the source of battery charging electrical energy.

On the stem of the meter stand at 18 is a plate covering a receptacle to which the vehicle battery charging cable is to be connected.

Referring to FIG. 6 we see that a battery charging cable 20 from the vehicle is provided with a male connection 22 to be inserted into female receptacle 24 mounted within the stand on plate 18.

The cable 20 would be provided by the vehicle owner and must have its connector 22 be complementary to receptacle 24. At 26 is a register recording the charges for the electricity provided.

A coin slot 28 is provided on one side of the dial to provide for payment for the electricity provided.

A locking means 30 comprising a slidable element to straddle the cable 20 and to extend over male connector 22 is provided. Locking means 30 is held in place by a solenoid means 32. Sliding element 30 downwardly also makes the actual connection between the source of electricity and the cable 20 through receptacle 24.

For ordinary use in overnight storage garages the vehicle cable 20 would be connected to the receptacle 24, the meter pointer 16 would be turned to the time for which it is desired to have the battery subjected to the charging current, and the lock 30 would be depressed to hold the element 22 in receptacle 24. In the morning it would be necessary to insert coins as required by reading the register 26 into coin slot 28 in order to unfasten the lock 30 so that the vehicle can be released for use.

The device could also be installed in shopping center parking lots in which case the operation would be that coins for the desired length of time would be inserted in slot 28 prior to turning the pointer to the desired time. The coin mechanism, then, would prevent turning the pointer 16 beyond the time for which coins had been inserted.

Alernatively, if the battery circuitry is provided with means to prevent overcharging, the operation could be as follows: the cable 20 would be connected to receptacle 24, the pointer 16 would be at 0, when the lock 30 is depressed the current would commence to flow and the pointer 16 would move to indicate the length of time the charging current was provided, and register 26 would indicate the amount of money to be inserted in coin slot 28 to release the cable 20 from receptacle 24. The overcharge preventing circuitry means for the battery would automatically trip a cut off switch in the vehicle that would, of course, stop the clock driving pointer 16 and would stop register 26 as current would stop flowing through receptacle 24.

Having thus described the preferred embodiment of the invention it should be understood that numerous structural modifications and adaptations may be resorted to without departing from the spirit of the invention.

What is claimed is:

1. A battery recharging meter stand for electric battery operated vehicles comprising a receptacle to which a battery recharging cable from a vehicle is to be connected, a timing device operated by flow of battery charging current to the cable to indicate the time during which such battery charging current has flowed, a register operated by the flow of current to the cable to indicate the cost per unit time times the number of units of time of flow of the battery charging current, means to lock said battery recharging cable from said vehicle to said receptacle, said last named means comprising a fork shaped slideable element to overlie a male connector of said cable, solenoid means, said means to lock being operatively connected to said solenoid means, means upon actuation of said slideable element for making the actual connection between the source of electricity and said cable so that the electrical connection is turned off when the locking means moves to the unlocked position.

2. The device of claim 1 in which said slideable element is held in place after manuel actuation by said solenoid means and is releasable upon payment of money.

3. The device of claim 1 in which there is provided an electric switch in said vehicle connected to said cable to cut off said current to prevent overcharging.